Patented Nov. 7, 1933

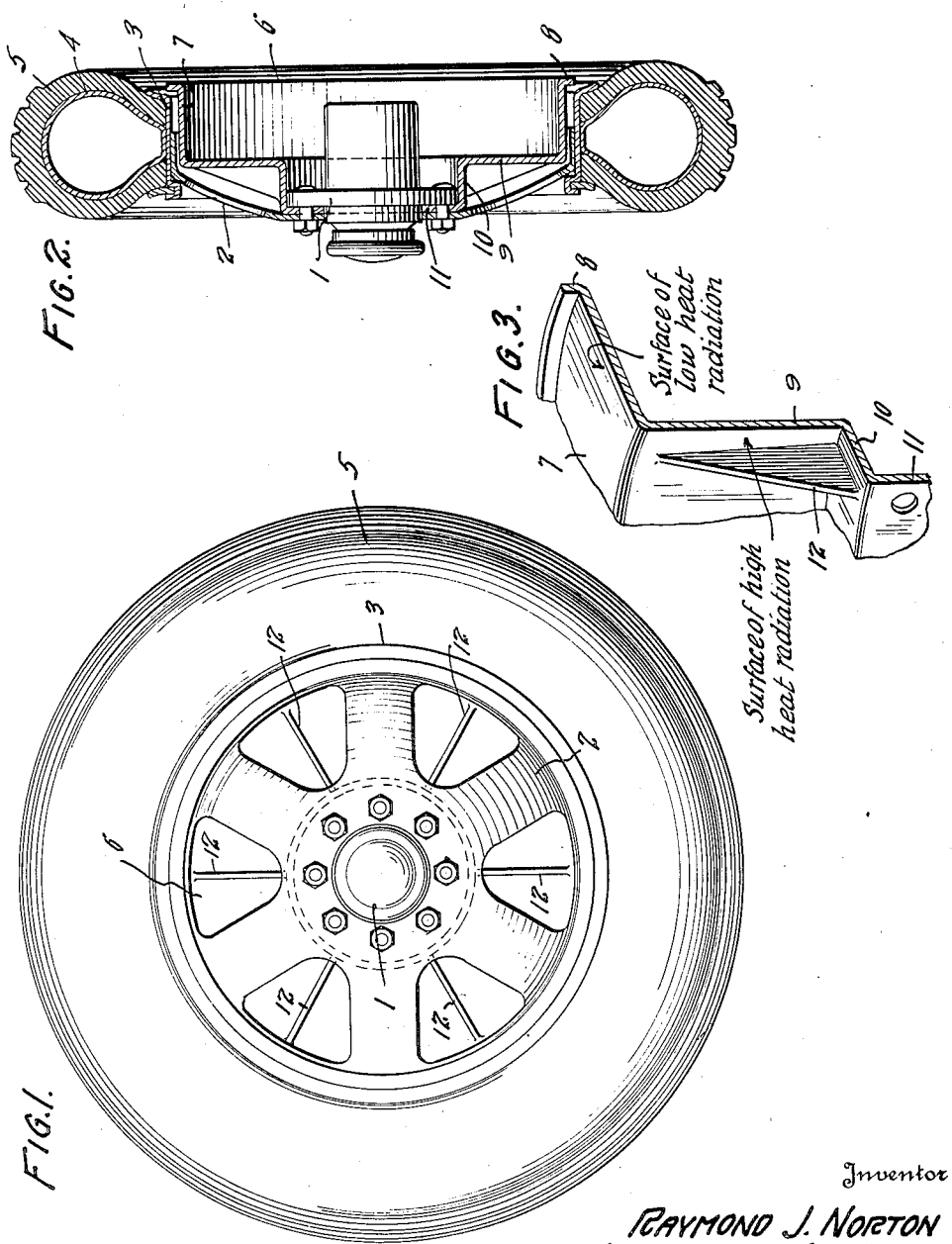

1,934,443

UNITED STATES PATENT OFFICE 1,934,443

BRAKE DRUM

Raymond J. Norton, Washington, D. C., assignor to Bendix Brake Company, South Bend, Ind., a corporation of Illinois Application April 15, 1931. Serial No. 530,351

9 Claims. (Cl. 188—218)

This invention relates to improvements in brake structures and more particularly to an improved brake drum.

The recent development in brake drums as applied to larger automotive vehicles, such as busses, trucks and the like, has been towards increasing the size of the drum to the maximum extent. This increase in size, however, has given rise to decided disadvantages. As the temperature of the drum is increased due to continuous braking action, the generated frictional heats are radiated from the exterior surface of the drum. Due to the relatively large diameter of the drum, this exterior surface is juxtaposed rather closely to the tire rim. As a result the frictional heats are transmitted to the rim and thence to the tire. This deleteriously affects the inner tube and greatly shortens its life.

This fact has been recognized heretofore and attempts have been made to obviate the disadvantages accruing from an increase in size of the brake drum. These, as a type, may be considered as providing a sheet of insulating material between the exterior of the brake drum and the tire rim. While this is effective, it introduces rather complicated additional elements of apparatus.

It is an object of the present invention to provide a novel method of shielding the tires of automotive wheels which are provided with brake drums of large diameter.

Another object of the invention is to provide an improved brake drum for busses and similar automotive vehicles.

A further object is to provide a brake drum of novel construction in which members which are closely juxtaposed to the exterior braking flange of the drum are shielded from generated frictional heats.

With these and other equally important objects in view the invention briefly considered comprises forming the surface of the brake drum contiguous to the tire carrying rim of a material, or coating this brake drum surface with a material, which considerably diminishes the dissipation of heat from the drum towards the tire carrying rim. In order to more clearly explain the invention, a diagrammatic illustration is shown in the three figures of the accompanying drawing.

The brake drums of the pleasure automotive vehicle, as a general rule, are constructed of stamped steel. However, the brake drums of busses, trucks and the larger vehicles, are usually constructed of cast iron because of the very large stresses imposed by the braking action and because it is difficult to obtain the stamping of a steel of sufficiently heavy gauge to withstand these stresses. These drums are usually constructed of as large a diameter as possible so as to give the maximum braking surface. Inasmuch as the brake apparatus is in reality a heat absorption machine, the kinetic energy of motion of the vehicle is transformed into heat. With most of the present brake drum constructions, as used on busses and heavy vehicles, a large part of the heat is radiated from the braking flange of the drum directly to the very closely adjacent surface of the rim, from whence it is transmitted to the inner tube of the tire. These cast iron drums are relatively easily corroded and when corrosion does set in, a film of iron oxide may form on the exterior surface. This accelerates the disadvantage stated because of the fact that the metal oxide is a better heat radiator than the metal itself.

According to the present invention an improved brake drum may be constructed and a longer life of the inner tube insured by permanently incorporating in the brake drum a thermal shield for the tire. This may be effected simply by coating the exterior surface of the braking flange, or that part which is closely subjacent to the tire carrying rim, with a material which is characterized by a low heat radiation or heat emissive factor.

As a general rule, bright, clean surfaces of metals very materially cut down the radiation or emission of heat. These, while effective, are rather difficult to obtain. In order to insure a permanent bright surface a substantially non-corrodible metal must be employed. This, as is well known, entails considerable expenditure. An effective material for this purpose would be sufficiently continuous and impervious plates of chromium or nickel. However, substantially the same results may be secured by applying a coat of a metal paint to this surface. This paint may be brushed, sprayed or applied in any other desired manner. Suitable paints are those which contain powder of pure metal, such as aluminum, bronze, zinc, etc. After the application of such a coat the exterior radiating surface of the braking flange is composed of a material with a low radiating factor. If desired, a paint may be made up comprising a suitable vehicle in which is properly dispersed a relatively non-oxidizable metal, and one which is preferably electro-positive to the metal of the brake drum so as to afford electro-chemical protection for the metal of the brake drum.

Another feature of the invention comprises treating the exterior exposed surfaces of the drum, which are not closely adjacent to the wheel carrying rim, in such a manner as to increase their heat radiation. For example, the exterior surface of the drum head, and if desired the interior of this portion of the drum, may be coated with materials which increase the radiation of heat therefrom. This may be done by coating these surfaces with a black body or with highly emissive substances like the oxides or carbonates of the metals, such as aluminum oxide and lead carbonate. Heat is dissipated from the brake drum both by convection and by radiation. At low temperatures dissipation by convection is the most important, but as the temperature rises the dissipation by radiation becomes of increasing value.

In the preferred form of the invention, therefore, a brake drum is constructed which comprises a head and circumferential braking flange, the exterior braking surface of the braking flange being formed of or coated with a material which is characterized by a low heat radiation or emission for the purpose of shielding the closely positioned tires against the effects of generated heat. In order to dissipate the generated heats and prevent overheating of the drum, the exterior exposed surface which is not closely positioned to the rim, such for example as the drum head, may be treated to increase heat dissipation therefrom. This is preferably done by coating the exterior surface of the drum head with aluminum oxide or with some other material having high heat emissivity. If desired, however, the dissipation of heat from this portion of the drum may be increased by increasing the convective area. In other words, the drum head is formed with heat radiating fins or other members which increase the total surface exposure and hence the total amount of heat dissipated by convection and radiation. The drum braking flange, on the other hand, is formed of a smooth surface of minimal exposed area.

To more clearly explain the invention a preferred embodiment is shown in the accompanying drawing, in which:

Fig. 1 is an elevation view of an automotive wheel and associated tire.

Fig. 2 is a center cross section of the wheel shown in Fig. 1; and

Fig. 3 is an enlarged detail of the brake drum construction.

There is shown in the drawing a wheel and associated brake drum which is conventionalized to illustrate generally truck and bus wheels in which the brake drum is of very large diameter and closely positioned with respect to the tire carrying rim. This unit may comprise a hub 1 to which is connected the spokes 2. This connection may be integral or detachable in any desired form. Suitably secured to the spokes or the supporting flange of the disk, in case the structure is a disk wheel, is the tire carrying rim 3 of any desired construction. This tire carrying rim supports the inner tube 4 and the tire casing 5. Either secured to the hub or to the spokes, or the disk, is a brake drum 6. This comprises a circumferential braking flange 7 which may preferably be provided with a marginal reenforcing lip 8. Integral with the braking flange is the radial disklike head 9. At the inner end of the head the drum is suitably conformed, as by the flanges 10 and 11, so as to secure the drum to the desired rotating part.

The drum is of relatively large diameter with respect to the diameter of the wheel, and the circumferential braking flange is positioned closely subjacent the tire carrying rim, as disclosed particularly in Fig. 2. As pointed out hereinbefore, in normal operations the heat generated as the result of frictional braking is transmitted to the drum and from thence is radiated from the exterior surface of the braking flange toward the tire carrying rim 3. As a result this rim heats up and heat is further transmitted to the inner tube and casing.

In the present construction overheating of the tire, inner tube and rim is avoided by forming the exterior surface of the braking flange of a material which has a low heat radiation. As noted, this may be done by coating this surface with a material which is characterized by a low heat radiation or heat emission factor, and preferably by the materials mentioned.

However, in order to prevent overheating of the drum, other portions of it are so designed as to dissipate heat at a rapid rate. This preferably is done by providing the heat radiating fins 12 on the head of the drum and of sufficient size and number to provide an extensive area for dissipation, both by convection and by radiation. The dissipation of heat by radiation, for a given area of the drum head, is further increased by treating the surface both of the drum head and of the fins with a material which radiates heat at a rapid rate. As described hereinbefore, this may comprise preferably a surface of aluminum oxide or some black body, like lamp black, which is an effective radiator. Manifestly in those circumstances where the drum is made integral with the disk of the wheel the exterior surface of the disk may be treated to increase its radiation and may also be provided with the heat radiating fins.

With this type of construction the path of the heat is deflected from the tire but the total heat radiated is maintained at a large value by increasing the dissipative factor of that portion of the drum which is not shielded, namely the exterior and/or interior of the drum head.

While a coating of the braking flange of the drum head has been described, it is to be understood that this is given merely as one method of modifying the heat dissipation characteristics of these parts. Other methods of modifying the thermal surface of the drum may be employed. Thus, for example, the drum head may be coated with pure aluminum which is then subjected to accelerated oxidation such as anodic oxidation, so as to form a film of aluminum oxide over the entire drum head. It is to be noted that when aluminum oxide is used as a high heat dissipating material it subserves the additional function of providing a substantially non-corrosive head for the drum.

While a preferred embodiment has been described, it is to be understood that this is given merely as an example of one method of effectuating the principles of the invention which are conceived to reside broadly in the idea of modifying the radiating characteristics of a braking flange of a drum, and likewise modifying the dissipative characteristics of the head of the drum so as to secure the desired results.

I claim:

1. A brake drum having a flange portion of low heat dissipation per unit area of the flange and a head portion of high heat dissipation characteristics per unit of area of the head.

2. A truck brake drum comprising a braking flange and a head, means to decrease the dissipation of heat from the flange, and means to increase the dissipation of heat from the head.

3. A brake drum having a head and braking flange, the head being of higher heat emissivity than the braking flange for a unit area of surface.

4. The method of protecting the tire construction of wheels which have a brake drum positioned closely adjacent the tire carrying rim which comprises modifying the surface of the braking flange so as to diminish the dissipation of heat from that part of the drum, and modifying the surface of the head of the drum so as to increase the dissipation of heat therefrom.

5. A brake drum having an integral head and circumferential braking flange, heat dissipating fins formed on the head; the exterior surface of the braking flange being provided with a surface of the type to decrease heat radiation therefrom and the head and fins being provided with a surface of the type to increase heat dissipation therefrom.

6. A cast iron brake drum having an integral braking flange and head, the exterior surface of the braking flange having a low heat dissipation per unit of area, and the surface of the head having a relatively higher heat dissipation per unit of area thereof.

7. A cast iron brake drum having an integral head and circumferential braking flange, a coating of material having a low heat emissivity on the braking flange and a coating of material having a higher heat emissivity on the head.

8. A cast iron brake drum having a head provided with heat dissipating fins, and a smooth braking flange, the braking flange having a surface of the type to decrease its heat emissivity and the head and fins having a surface of the type to increase its heat emissivity.

9. A brake drum having an integral head and circumferential braking flange, heat dissipating fins formed on the head, a coating of material having a low heat emissivity on the braking flange and a coating of material of higher heat emissivity on the head and fins.

RAYMOND J. NORTON.